April 21, 1953  R. SHERMAN  2,636,131
MAINTENANCE OF CONDUCTIVITY IN ELECTRICAL SYSTEMS
Original Filed Dec. 31, 1946
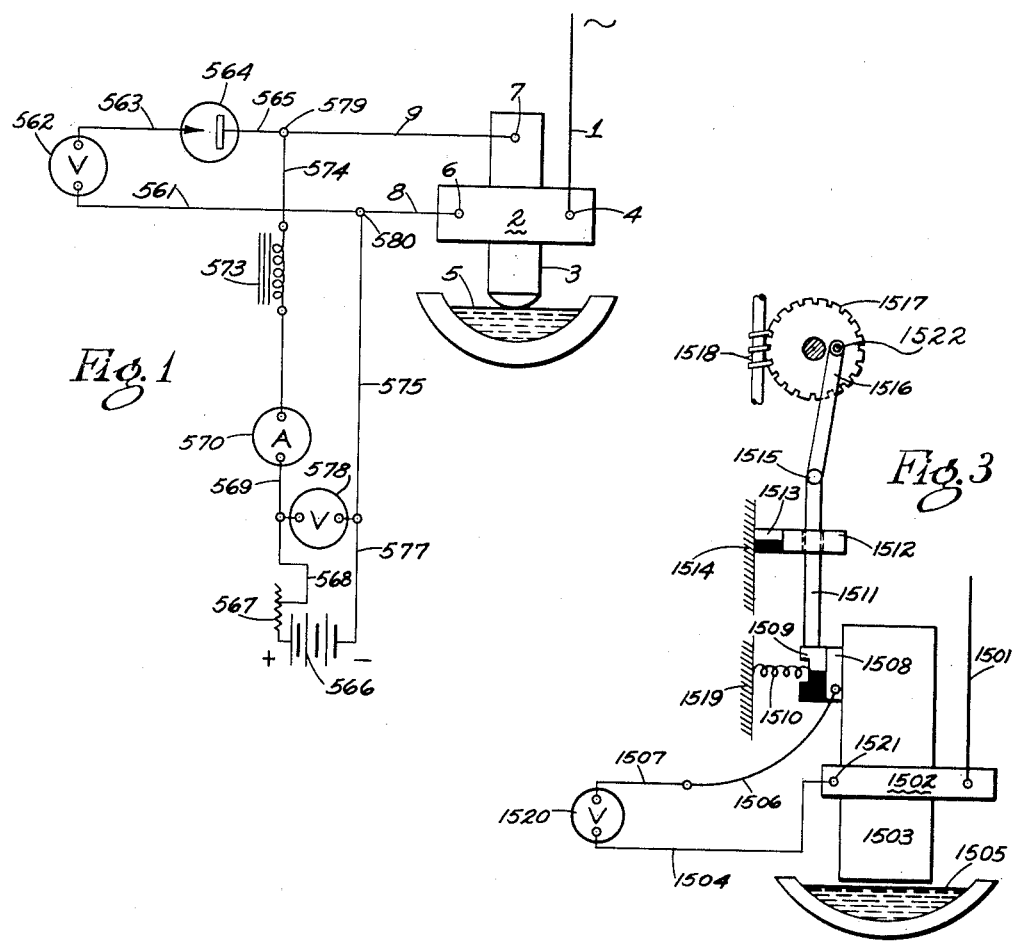
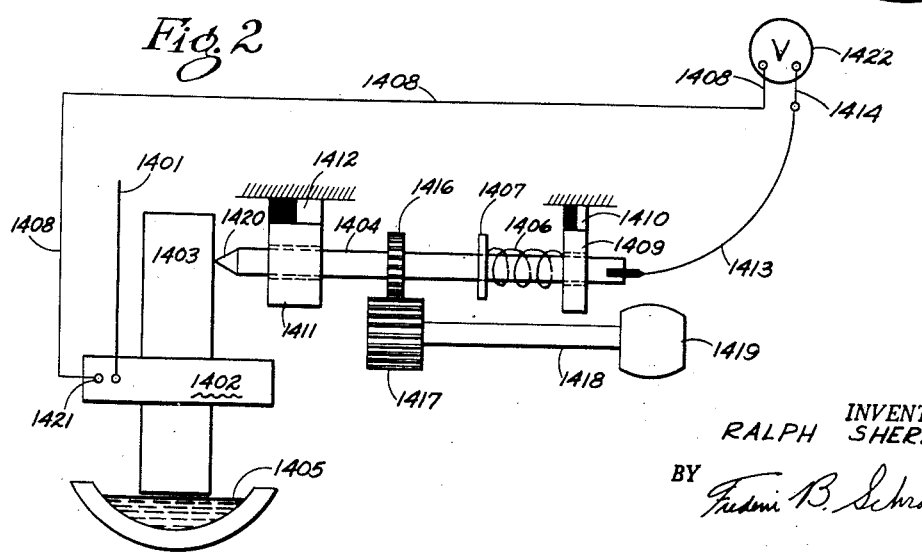
INVENTOR.
RALPH SHERMAN
BY Frederic B. Schramm
ATTORNEY Patented Apr. 21, 1953

2,636,131

UNITED STATES PATENT OFFICE 2,636,131

MAINTENANCE OF CONDUCTIVITY IN ELECTRICAL SYSTEMS

Ralph Sherman, Warren, Ohio

Original application December 31, 1946, Serial No. 719,368. Divided and this application November 1, 1950, Serial No. 193,406

9 Claims. (Cl. 307—2)

This application is a division of my copending application, Serial No. 719,368, filed December 31, 1946, on which Patent No. 2,528,558 was granted November 7, 1950.

This invention relates to the maintenance of conditions of good conductivity in electric systems. It is concerned more particularly with the protection of low voltage and current circuits, such as measuring circuits, signalling circuits and the like containing a number of contacting conductive parts (contacts).

It is a well known fact that electrical systems of this kind are frequently endangered by an appreciable deterioration of contact between contacting conductive parts, which may be caused by the formation of thin oxide layers and other insulating layers at points exposed to the action of heat, dust, oxidizing gases or the like.

It is one of the objects of this invention to maintain, in spite of such disturbances, a fair degree of conductivity at such contacts whereby to prevent temporary or extended interruption of the circuit.

It is thus, an object of the invention to obtain a high degree of reliability and continuity of service in electric systems and in devices for electric systems such as protective circuits and measuring circuits, including those circuits in which relatively low voltages act, or in which even very slight deterioration of contacts or minute deviation in contact resistance may have disadvantageous or even disastrous results. A further object of the invention is to provide circuit restoration means which are not only highly reliable and have assured continuity of functioning, but which are also inexpensive and of the utmost simplicity.

Other and further objects, features and advantages of the invention will become apparent as the description proceeds.

In my copending application, Serial No. 719,367, filed December 31, 1946, I have disclosed and claimed an arrangement for testing and eventually improving the conditions of conductivity of electric systems containing contacts which comprises sending from time to time through the contacts current impulses of a voltage exceeding the voltage normally impressed on the contacts to such an extent that any insufficiently conductive layer which may have formed between the contacting parts, is punctured and full conductivity restored. In order to prevent the current impulses from damaging or otherwise endangering the instruments inserted in the circuit, it was necessary to cut out that section of the circuit which contains such instrument, whenever the impulses were to be sent through the system.

As explained in my aforesaid parent application, Serial No. 719,368, good conditions of conductivity can be maintained also, without any part of the circuit being required to be cut out beforehand, by providing means for guiding the restoring current in such manner as to allow it to act on the contacts without affecting the instrument or instruments. In consequence of this arrangement the restoring current can be fed permanently to the circuit to be protected. This current may be furnished by a separate source, whose E. M. F. amounts to a multiple, frequently a thousandfold of that which normally arises as drop of potential in that section of the circuit. This materially higher E. M. F. causes any considerable insulating layer formed between two contacting parts to be punctured at once, or a degree of conductivity to be restored which offers no excessive resistance to the passage of very small measuring currents.

Restoring may already take place with a current amounting to a fraction of one ampere. However, under certain conditions the maximum amperage to be supplied to contacts of low amperage measuring circuits must not exceed a few amperes, as otherwise the to be restored contacts might burn out. Thus, according to the present invention, the restoring current may be fed to the system to be protected permanently and without any interruption and any deteriorated contact will be improved and full conductivity restored by it automatically, while the main circuit is traversed by its working current.

The guiding or blocking means which deflect or block the auxiliary restoring current from the section containing sensitive instruments or devices, allow the working current, such as the measuring current in a measuring system, to pass through such section without any hindrance. These guiding or blocking means enable such a current intensity or voltage to arise in any section of the system as may be required for the restoration of the endangered contact, by concentrating the effect of the restoring current on that part of the system which contains the contact or contacts which may require restoration.

The intensity of voltage of the restoring current may be controlled by conventional measuring instruments (ammeters and voltmeters) which will also indicate any deterioration of conductivity at the contacts within any section of the system.

In the drawings affixed to this specification and forming part thereof, a number of embodiments of the invention are illustrated diagrammatically by way of example.

In the drawings:

Fig. 1 is a diagram of an A. C. measuring system protected by a D. C. restoring arrangement.

Fig. 2 shows the protection of electric contacts by mechanical means, and

Fig. 3 illustrates another arrangement in which the mechanical parts slide on the contact surface.

Referring to the drawings and first to Fig. 1, only a voltmeter 562 is shown here as the measuring instrument in the electric system, but it should be understood that it stands here for any type of measuring or indicating instrument or device adapted for use in such a system. The system further comprises an electrode holder 2 and electrode 3 of an electric arc furnace containing a body of molten metal. The working current or load current is fed to the holder 2 through the wire 1 connected to the point 4. The measuring instrument 562 is provided to indicate any variations of the drop of potential between the holder 2 and its electrode 3. It is connected to the holder at 6, to the electrode at 7. These two "contacts" are subject to the action of the heat, the dust and the gases issuing from the body of metal 5 in the furnace and the conductivity at these points is bound to deteriorate under this action, whereby the indication of changes of the drop of potential by the voltmeter would be rendered faulty.

Restoration of conductivity of these contacts is effected whenever any material deterioration has taken place, by an additional current fed to the system from a current source 566 and flowing through the connection points 6 and/or 7, this additional current having an E. M. F. and intensity such that it will puncture the insulating layer formed between the contacting parts.

In order that this restoration can take place automatically during operation of the system and without any danger to the voltmeter or the like, I provide guiding means which force the restoration current to flow through a predetermined path which avoids the measuring instrument. In the present case, where the current source (battery 566) furnishes direct current, the rectifier (valve) 564 acts as guiding or blocking means for diverting restoration current from the measuring or detecting instrument or other auxiliary device or circuit responsive to electrical conditions at the points 6 and 7. In the circuit comprising the measuring instrument 562 alternating current flows from the connection 6 at the electrode holder 2 through the wires 8 and 561, voltmeter 562, wire 563, rectifier 564, wires 565 and 9 to the connecting point 7 on the electrode 3. The valve 564 as such would allow only one-half wave of the drop of potential to pass through. However, since it is not the absolute value of this drop of potential, but its changes, that is of interest here, the passage of one-half of a wave is all that is required.

At the same time current flows from the positive pole of the source 566 of direct current through the regulating resistance 567, wires 568 and 569, ammeter 570, choke coil 573, wire 574, connection 579, wire 9, connection 7, electrode 3, electrode holder 2, connection 6 of the measuring circuit, wire 8, connection 580, wire 575, and wire 577, back to the negative pole of the current source 566.

The current, being positive at the connection 579, is not capable of passing through the rectifier 564, as this latter is arranged in the circuit, but is forced to take the way through wire 9 and the measuring connection 7 and 6. On applying sufficient amperage and voltage, the current will puncture any insulating layer which may have formed at the points 6 or 7, and will thus restore conductivity automatically, while the measuring system is being traversed by its (alternating) working current. The amperage is regulated by means of the regulating resistance 567. The E. M. F. of the current source 566 may also be made regulatable, if desired.

While the amperage passing through from the protective device is indicated by ammeter 570, the voltage is indicated by voltmeter 578. These two instruments allow of watching the degree of conductivity at the contacts 6 and 7. This is facilitated by the use of a current of an intensity which may amount to hundred times the intensity of the measuring current in the system. If for some reason it should be desirable to obtain exact data regarding the degree of deterioration of conductivity at the contacts, the E. M. F. from the source of restoring current should be chosen as low as not to enable the insulating layer to be punctured, whereupon it should be raised gradually until puncturing occurs. The voltage required to do it can thus be ascertained easily. Moreover, the successful functioning of the circuit restoration means is very easily checked visually by reliable, simple instruments such as the ammeter 570 and the voltmeter 578, either or both of which might also take the form of automatically operating indicators or alarm devices if automatic check up on the functioning of the circuit restoration is desired.

As shown, the source of restoration current 566 is a simple battery reliable in functioning, and the electromotive force of which depends in no manner upon the maintenance of good contacts in any of its elements. Moreover, if some contact deterioration should take place such as in the connections to the battery, in the connections in the rheostat 567 or in the sliding tap, or in the connections to the ammeter 570, to the choke coil 573, or in the connections to the measuring circuit at 579 and 580, automatic restoration of circuit conductivity at these points is automatically assured by the same means as circuit conductivity is restored, if necessary, throughout the auxiliary circuit to be supervised or to be protected such as at the contacting connection terminals 6 and 7.

It is quite evident that the circuit restoration means illustrated is inexpensive and very simple. For the reasons indicated it has a high degree of reliability, not only in the functioning but in the assurance of the continuance of the supply current. Variations in the circuit contacts in the circuit to be supervised have no effect on the output or electromotive force of the current source 566. The degree of restoration which is provided such as in the contact at the terminals 6 and 7, for example, is in proportion to the need therefor. This happens because the greater the contact deterioration, the greater its resistance and the greater the voltage drop therein, so therefore, the greater the restorative effect of the restorer current from the source 566. Good contacts are thus assured in the auxiliary or measuring circuit including the connections of the conductors 8 and 9 and of the voltmeter 562.

As shown in Fig. 1, the arrangement is employed for supervising contacts such as might be employed if desired for connecting leads 8 and 9 to the electrodes 2 and 3. These contacts may be either movable or temporary contacts or they may be so called permanent or fixed contacts. Moreover, my circuit restoration system functions effectively even though the contact resistance such at as the terminals 6 and 7 may be very small in comparison with internal battery resistance, current limiting resistance such as in the rheostat 567, the ohmic component of the impedance of the choke coil 573, etc.

The choke coil 573 prevents the indications of the main instrument 562 from being influenced by opposing a high resistance to the alternating current, i. e. to the drop of potential between the electrode and its holder, while to the direct current from the protective device it offers only a comparatively low ohmic resistance. Therefore the protection device may be inserted any length of time without influencing the measurements of the instrument 562.

Any appreciable partial deterioration of any contact in the respective section of the measuring circuit, and more especially of the contacts 6 and 7, will be instantly removed. At the same time the indicating devices in the restoring circuit continually indicate the actual condition of the respective part of the circuit.

If these indicating devices are combined with suitable signalling means, a signal will become perceptible, for instance, visible or audible automatically as soon as one of the measuring contacts has suffered deterioration to such an extent that it could not be restored.

The rectifier 564, as was mentioned above, allows the passage of only a half wave of the alternating voltage to be measured. If it should be desired to afford passage for the entire wave, the rectifier might be replaced by a condenser, which blocks the direct current from the restoring circuit as effectively as the rectifier.

If the working current amperage passing between the electrode 2 and its holder is very high, while the inner resistance between these parts is very low, as is the case with electric furnaces, the choke coil 573 may be dispensed with and the protective device may still be inserted permanently in the circuit without influencing the measuring instrument 562. But also if the inner resistance is high, the choke coil may be dispensed with, if the protective device is actuated only for a short period of time, since then the instrument 562 will also be influenced only during a short period of time. One may also dispense with a regulation of the source of direct current 566.

The voltmeter and ammeter of the restoration circuit may be replaced by an incandescent lamp or any other suitable device which, if connected in series with the current source, may serve directly as a limitation resistance and as a crude kind of indicating device for the passage of current and for its amperage. Another lamp or other parallel connected voltage-responsive device may crudely indicate the potential.

The above described restoring device may be used also if the working current does not flow in the network.

Fig. 2 illustrates the protection of the contacts with the aid of partly mechanical means. For the sake of clearness mechanical protection of contacts is shown only with reference to one contact point, between the electrode 1403 and contact spindle 1404, but obviously such protection might also be provided at all other contact points. 1401 is a current supply to the electrode holder 1402 from which the current flows through the electrode 1403 and the body 1405 of molten metal. The drop of potential between the electrode holder and the electrode is measured with the aid of a wire 1408 connected to the electrode holder 1402 at 1421 and leading to the voltmeter 1422. The other measuring wire is here connected to the electrode 1403 by means of a screw spindle 1404 with a point 14020. The spindle is supported in two bearings 1409 and 1411, with insulating material 1410 and 1412, respectively, holding the bearings in place. At the spindle and opposite the point 1420, the measuring wire 1413 is fixed by soldering or welding, this wire leading through wire 1414 to the other pole of the instrument 1422. The point 1420 of the spindle 1404 is preferably made of a material which can withstand the action of heat and smoke gases. Nevertheless, under the conditions existing in an electric furnace the point will after some time be subject to oxidation. During operation of the furnace dust settles on the electrode and, therefore, the contact between the point 1420 and the electrode may be poor from the beginning or may deteriorate considerably during operation.

In order to counteract this, the spindle 1404 is forced with considerable pressure by a spring 1406, acting on the collar 1407 against the bearing 1409, and its point 1420 is thus forced against the electrode 1403. A motor 1419 drives by means of a spindle 1418 a gear 1417 meshing with a gear 1416 on spindle 1404. The motor is controlled by a switching device (not shown) of well known construction, for instance, in combination with a worm gear which causes it to make short turns alternately to the right and to the left whereby the spindle 1404 is constantly reversed also. Owing to the combined axial and alternating circumferential movements of the spindle, sliding friction is created between the point 1420 and the electrode. This sliding friction keeps the contacting surfaces clean by loosening any oxide layers which may form. The pressure exerted by the spring could be such that the point 1420 gradually enters the electrode material, whereby a good contact is ensured.

The wire 1413 may also be connected to the motor spindle by means of a collector brush sliding on a collecting ring (not shown) mounted on and connected to, the spindle 1404.

The spring 1406 might be arranged in some other place and may be assisted, or replaced, by any other pressure-producing medium, including for instance a solenoid. The pressure exerted on the contact point may be permanent or intermittent. This device can be used not only with carbon electrodes, but also with conductive bodies of some other material, and more especially with metal.

In any case provision must be made for a relative shifting under pressure of the contacting surfaces occurring permanently or at intervals.

The described moving of a contacting part may, of course, be effected by any suitable means.

Fig. 3 illustrates the protection of contact with the aid of mechanical means producing a sliding movement on the contact surfaces.

Here 1501 indicates the current feed to the electrode holder 1502, the electrode 1503 and the body 1505 of a molten metal.

The drop of potential between the holder and the electrode is indicated by the voltmeter 1520 which is connected to the holder 1502 by a wire 1504. The other terminal of the voltmeter is connected to the electrode 1503 by wire 1507, pliable wire 1506 and contact brush 1508, to which wire 1506 may be welded. This brush is forced against the electrode by a spring 1510 acting on the brush through an insulating piece 1509. Since, in spite of the pressure exerted on the brush, oxidation of the contact surface may be caused by the heat or the action of gases, I provide for reciprocatory sliding movement of the brush by means of a driving mechanism comprising the worm gear 1518, 1517, an eccentric 1522 on the gear, a rod 1516, link bolt 1515 and link 1511 extending through a guide 1512 fixed at 1514 by means of an insulating piece 1513. The brush reciprocated by this mechanism, being acted upon by the spring 1510, creates sliding friction on the surface of the electrode 1503 whereby any oxide layer and dust deposited on this surface is removed and good conductivity secured.

Instead of a metal brush, a carbon brush may be used, more especially when the conductor is made of metal, whereby any appreciable wear on the contact surface is avoided. Of course, the carbon brush, when moving, may follow simultaneously any other path, for instance, a circular or elliptic one.

Also in Fig. 3, for the sake of clearness, mechanical means for protecting contacts are shown only at one point of contact. In cases where the measuring contact is exposed to particularly strong injurious action, both kinds of restoring devices, mechanical and electrical, may be combined. If in certain cases it should appear desirable to ascertain whether a material deterioration has occurred, the same restoring arrangement can be applied, however the restoration voltage should then be so low at the start that a puncturing to restore conductivity cannot be obtained. The voltage is then raised gradually and by watching both the voltage and the amperage one can find out whether an insulating layer has been punctured. The value of the voltage required will allow the degree of deterioration to be ascertained.

In order to facilitate reading the instruments, they may be provided with a plurality of measuring ranges and/or amplifiers may be used. The restoring device may also be combined with a signalling device which will give a warning in case the deterioration has proceeded to a point where no improvement is possible any more. Then the condition of the contacts can be watched constantly. The restoring effect is obtained automatically while the measuring system is in full operation.

In Figs. 2 and 3, the combined restorer effect may be obtained, including that of the mechanical action of rotating or sliding contact and the electrical action of a source of contact maintaining voltage such as illustrated in Fig. 1 or in the other figures of my parent application, Serial No. 719,368, or that of intermittent or sole electrical impulse effect such as described more particularly in my copending application, Serial No. 719,367, filed December 31, 1946. Although a specific type of mechanically acting contact conductivity maintaining arrangement has been disclosed in Figs. 2 and 3, it will be understood that the invention is not limited thereto, and does not exclude the use of the mechanical action of sound waves or supersonic waves in the maintenance of contact conductivity nor does it exclude use of artificially or naturally produced electromagnetic fields, singly or in combination with other forms of conductivity maintenance described in my aforesaid parent application, Serial No. 719,368 and the copending application, Serial No. 719,367.

Whenever no supervision of the contacts is required, the restoring device can be simplified materially. For instance, the means for regulating the voltage may be dispensed with and the measuring instruments may be much simpler or may even be replaced by incandescent bulbs.

While in the foregoing only combinations of the restoring device with measuring systems of various kinds has been described, it will be obvious that it will be of equal use in combination with any other kind of electrical system operating with low amperages and voltages, for instance, signalling or checking systems. Also rotary contacts may be supervised and kept in a high state of conductivity by its application.

When the deterioration of the conductivity in contacts exceeds a certain limit, the restoring current may give rise to very high voltages which might injure the guiding or blocking devices. This may be prevented by the use of conventional devices for overvoltage protection.

The rectifiers, choke coils, etc., serving as guiding or blocking means may, of course, be replaced by any other devices capable of allowing the restoring current to pass through the section to be protected of the system, but counteracting its injurious action on other sections. Even electronic valves may serve the purpose if they are so arranged as to protect the measuring instrument against the action of excess voltage. This may be used, in a well known manner, for creating a short circuit path and/or abolishing the excess voltage created by the restoring device.

It may be well to point out also the utility of a restoring device according to the invention, if used in connection with measuring methods serving to supervise rivet connections, welding joints and screw connections during or after manufacture. Such methods operate with separate current which passes through the contacting paths and indicate changes of the voltage drop. They were hitherto not adapted for use as testing methods during operation of a machine or engine because, if the contact in the measuring circuit should deteriorate or open up altogether, the entire measuring system would cease to act. Here also a restoring device will enable the correct functioning of such a system to be maintained permanently. Important joints in steam engines, diesel engines, airplane structures and the like may thus be supervised reliably through an indefinite period of time.

Various changes may be made in the structural combinations of means and in the operation of the devices hereabove described without departing from the spirit of the invention or sacrificing the advantages thereof.

What is claimed is:

1. In combination with a detecting instrument having leads adapted to be connected to points in a system of predetermined voltage, for response to electrical conditions at such points, such leads and connections including contacts subject to formation of layers of low-conductivity and incapable of being broken down by voltages of said predetermined value, mechanism for producing relative movement between one of the contacts and the member against which it lies.

2. In an electrical current conducting system having connections including contacts subject to formation of layers of low conductivity and incapable of being broken down by voltages normally present in the system, mechanism for producing relative movement between one of the contacts and the member against which it lies.

3. Apparatus as set forth in claim 2 in which the motion producing mechanism includes a drive shaft for rotating the movable contact.

4. Mechanism as in claim 3 wherein the contact moving mechanism includes a reciprocating device for rubbing the contact along the member against which it lies.

5. Mechanism as in claim 2 whereas the relatively movable contacts are subjected to the action of sound waves and the motion producing mechanism comprises a sound wave generator.

6. Mechanism as in claim 2 whereas the relatively movable contacts are subjected to the action of supersonic waves and the motion producing mechanism comprises a supersonic wave generator.

7. Apparatus as in claim 2 wherein the contacts having layers of low conductivity are subjected to the action of electromagnetic waves for breaking down such layers.

8. Apparatus as in claim 2 wherein the conductivity maintaining action of relatively movable contacting members is utilized in combination with a conductivity maintaining effect of one of the group of effects produced by single voltage impulses, intermittent voltage impulses, permanently applied conductivity-maintaining voltage, and electromagnetic waves, and the relative mechanical motion is produced by one of the group of forms of mechanical energy consisting of supersonic waves, audible sound waves, rotatively driven mechanism, and reciprocating mechanism.

9. In an electrical current conducting system having connections including contacts subject to formation of layers of low conductivity and being incapable of being broken down by voltages present in the system, a source of electromagnetic waves continuously functioning and mechanism for subjecting the system to the action of such electromagnetic waves.

RALPH SHERMAN.

References Cited in the file of this patent

UNITED STATES PATENTS

| Number | Name | Date |
|---|---|---|
| 2,183,838 | Hornickel | Dec. 19, 1939 |